United States Patent
Hoover et al.

(10) Patent No.: US 8,699,053 B2
(45) Date of Patent: Apr. 15, 2014

(54) SYSTEM AND METHOD FOR MOBILE PRINTING FROM A DESKTOP OPERATING SYSTEM USING A PORTABLE COMPUTING DEVICE

(75) Inventors: Rick P. Hoover, Boise, ID (US); Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1357 days.

(21) Appl. No.: 10/053,673

(22) Filed: Jan. 24, 2002

(65) Prior Publication Data
US 2003/0137690 A1    Jul. 24, 2003

(51) Int. Cl.
- *G06F 3/12* (2006.01)
- *G06F 15/16* (2006.01)
- *G06F 17/00* (2006.01)

(52) U.S. Cl.
USPC ......... 358/1.15; 358/1.13; 358/1.16; 358/1.9; 709/206; 709/223; 709/224; 715/273; 715/274

(58) Field of Classification Search
USPC ........ 358/1.15, 1.9, 1.13, 402, 403, 407, 468; 709/223, 224, 206; 715/700, 526, 527
See application file for complete search history.

(56) References Cited

U.S. PATENT DOCUMENTS

| | | |
|---|---|---|
| 5,539,665 A | 7/1996 | Lamming et al. |
| 5,561,528 A | 10/1996 | Johnson et al. ............... 358/296 |
| 5,636,333 A | 6/1997 | Davidson, Jr. et al. |
| 5,640,495 A | 6/1997 | Colbert et al. |
| 5,651,114 A | 7/1997 | Davidson, Jr. |
| 5,699,493 A | 12/1997 | Davidson, Jr. et al. |
| 5,699,494 A | 12/1997 | Colbert et al. |
| 5,720,015 A | 2/1998 | Martin et al. |
| 5,727,135 A | 3/1998 | Webb et al. |
| 5,754,748 A | 5/1998 | Rivers et al. |
| 5,797,061 A | 8/1998 | Overall et al. |
| 5,819,015 A | 10/1998 | Martin et al. |

(Continued)

FOREIGN PATENT DOCUMENTS

| | | |
|---|---|---|
| EP | 0886206 | 12/1998 |
| EP | 0893760 A2 | 1/1999 |

(Continued)

OTHER PUBLICATIONS

Nadio, "Business Solutions", Jul. 11, 2001, 2 pgs., <http://www.nadio.com/temp/business_solutions/businessplan.html>.

(Continued)

*Primary Examiner* — Steven Kau

(57) ABSTRACT

A method, printer, system, and program product for mobile printing, comprising, in one embodiment, the steps of: obtaining a portable computing device with a reference to a printer-independent On-the-Go-print queue on the Internet; obtaining print data; and transferring the print data to the On-the-Go Print Queue on the Internet. In a further aspect of the present invention, the On-the-Go Print Queue may be accessed to set at least one storage or print parameter. In a further aspect of the present invention, the print data may be converted to generic print data and encrypted prior to transferring the print data to the On-the-Go Print Queue. In a yet further aspect, a key for decryption and the reference for the On-the-Go print queue may obtained at a printer from a portable computing device such as a smart card.

46 Claims, 10 Drawing Sheets

(56) References Cited

U.S. PATENT DOCUMENTS

| | | | |
|---|---|---|---|
| 5,848,413 | A | 12/1998 | Wolff |
| 5,862,321 | A | 1/1999 | Lamming et al. |
| 5,905,852 | A | 5/1999 | Love et al. |
| 5,915,214 | A | 6/1999 | Reece |
| 5,974,416 | A | 10/1999 | Anand |
| 5,982,994 | A * | 11/1999 | Mori et al. ............... 358/1.15 |
| 6,003,069 | A | 12/1999 | Cavill |
| 6,028,675 | A | 2/2000 | Fields et al. |
| 6,031,624 | A | 2/2000 | Murphy ............... 358/1.17 |
| 6,046,817 | A | 4/2000 | Brown et al. ............ 358/1.16 |
| 6,173,407 | B1 | 1/2001 | Yoon et al. |
| 6,184,996 | B1 * | 2/2001 | Gase ..................... 358/1.15 |
| 6,189,788 | B1 | 2/2001 | Sherman |
| 6,324,521 | B1 | 11/2001 | Shiota |
| 6,347,340 | B1 | 2/2002 | Coelho |
| 6,379,058 | B1 | 4/2002 | Petteruti |
| 6,400,272 | B1 | 6/2002 | Holtzman |
| 6,407,820 | B1 | 6/2002 | Hansen |
| 6,448,906 | B1 | 9/2002 | Nachtsheim et al. |
| 6,452,689 | B1 | 9/2002 | Srinivasan |
| 6,453,129 | B1 | 9/2002 | Simpson et al. |
| 6,501,832 | B1 | 12/2002 | Saylor |
| 6,601,102 | B2 | 7/2003 | Eldridge |
| 6,738,841 | B1 | 5/2004 | Wolff |
| 6,744,528 | B2 | 6/2004 | Picoult |
| 6,751,732 | B2 | 6/2004 | Strobel et al. |
| 6,757,749 | B2 * | 6/2004 | Aoki et al. ............... 710/5 |
| 6,772,338 | B1 | 8/2004 | Hull |
| 6,778,289 | B1 | 8/2004 | Iwata |
| 6,782,542 | B1 | 8/2004 | Mein |
| 6,842,460 | B1 | 1/2005 | Olkkonen |
| 6,857,023 | B2 | 2/2005 | Rivadalla |
| 6,859,832 | B1 * | 2/2005 | Gecht et al. ............ 709/224 |
| 6,862,583 | B1 * | 3/2005 | Mazzagatte et al. ........ 705/64 |
| 6,912,060 | B1 | 6/2005 | Luciano et al. |
| 6,920,506 | B2 * | 7/2005 | Barnard et al. ........... 709/245 |
| 6,980,319 | B2 * | 12/2005 | Ohta ..................... 358/1.18 |
| 7,068,387 | B2 | 6/2006 | Ahne et al. |
| 7,196,803 | B1 | 3/2007 | Simpson et al. |
| 7,262,873 | B1 | 8/2007 | Rasche et al. |
| 7,284,061 | B2 * | 10/2007 | Matsubayashi et al. ...... 709/229 |
| 7,385,718 | B2 | 6/2008 | Berkema et al. |
| 7,454,796 | B2 * | 11/2008 | Mazzagatte et al. .......... 726/28 |
| 7,526,555 | B2 | 4/2009 | Shahindoust |
| 7,656,545 | B1 | 2/2010 | Simpson et al. |
| 7,808,660 | B2 | 10/2010 | Ahne et al. |
| 2001/0016921 | A1 | 8/2001 | Takata |
| 2001/0037462 | A1 | 11/2001 | Bengtson |
| 2001/0048533 | A1 | 12/2001 | Koana |
| 2002/0002592 | A1 | 1/2002 | Aoki et al. |
| 2002/0032652 | A1 | 3/2002 | Aoki et al. |
| 2002/0061183 | A1 | 5/2002 | MacInnis |
| 2002/0078160 | A1 | 6/2002 | Kemp et al. |
| 2002/0083114 | A1 | 6/2002 | Mazzagatte et al. |
| 2002/0188646 | A1 | 12/2002 | Terrill |
| 2003/0093670 | A1 * | 5/2003 | Matsubayashi et al. ...... 713/168 |
| 2006/0181730 | A1 | 8/2006 | Moore |
| 2009/0064346 | A1 | 3/2009 | Larsson et al. |

FOREIGN PATENT DOCUMENTS

| | | |
|---|---|---|
| EP | 0974890 | 7/1999 |
| EP | 0936808 A1 | 8/1999 |
| GB | 2342197 | 4/2000 |
| GB | 2356321 A | 5/2001 |
| WO | WO-0133365 | 5/2001 |
| WO | WO-0142894 | 6/2001 |
| WO | WO-0203319 A1 | 1/2002 |

OTHER PUBLICATIONS

Nadio, "What is InternetPrint", Jul. 11, 2001, 3 pgs., <http://www.nadio.com/temp/why_internetprint/how.html>.

Nadio, "Why InternetPrint", Jul. 11, 2001, 2 pgs., <http://www.nadio.com/temp/why_internetprint/what_iprint.html>.

Nadio, "Nadio InternetPrint", Jul. 11, 2001, 3 pgs., <http://www.nadio.com/temp/internetprint/business.html>.

Nadio, Jul. 11, 2001, 1 pg., <http://www.nadio.com/temp/images/wfirewall.gif>.

PrinterOn, "Print Simply Anywhere", Jul. 11, 2001, 1 pg., <http://www.printeron.net/Page?PAGE=Home>.

PrinterOn, "How it Works", Jul. 11, 2001, 1 pg., <http://www.printeron.net/Page?PAGE=StartHere&WebLogicSession=>.

PrinterOn, "Directory", Jul. 11, 2001, 1 pg., <http://www.printeron.net/Page?PAGE=FindPrinter&WebLogicSessior=>.

HP Invent, "Search", Jul. 11, 2001, 2 pgs., <http://www.hp.com/query.html?qt=smart+card&col=hpcom+ccen>.

HP Invent, "Smart Card Protection", Jul. 11, 2001, 2 pgs., <http://www.hp.com/notebooks/us/eng/solutions/security/smart_prc>.

HP Invent, "JetCAPS—Business Printing Solutions", Jul. 11, 2001, 1 pg., <http://www.jetcaps.com/jetcaps/>.

HP Invent, "Solutions Portfolio", Jul. 11, 2001, 1 pg., <http://www.jetcaps.com/jetcaps/solutions/>.

HP Invent, "JetCAPS SecureJet", Jul. 11, 2001, 1 pg., <http://www.jetcaps.com/jetcaps/solutions/securejet.html>.

HP Invent, "JetCAPS® SecureJet®", 2 pgs., <http://www.jetcaps.com>.

HP Invent, "What is Instant Delivery?", Jul. 11, 2001, 1 pg., <http://www.instant-delivery.com/Home/whatis.asp>.

HP Invent, "HP Instant Delivery", Jul. 11, 2001, 4 pgs., <http://www.hp.com/ghp/teatures/instantdel/>.

Communication pursuant to Article 94(3) EPC issued in connection with European Application No. 02254492, dated May 20, 2008

European Search Report issued in connection with European Application No. 02254492, dated Mar. 4, 2004.

Hewlett-Packart Company, "JetCAPS SecureJet," available Mar. 11, 2001, <http//web.archive.org/web/20010311193657/http://www.jetcaps.com/jetcaps/solutions/securejet.html>.

Hewlett-Packard Development Company, L.P. "HP Universal Print Driver," Solution and Feature Guide, 2009, <http://h20331.www2.hp.com/Hpsub/downloads/UPD5_guide_final,%20web.pdf>.

Pei et al., "Bluetooth—The Fastest Developing Wireless Technology," International Conference on Communication Technology Proceedings, 2000, WCC-ICCT 2000, vol. 2, Aug. 21-25, 2000, pp. 1657-1664.

* cited by examiner

Fig. 3 (contd)
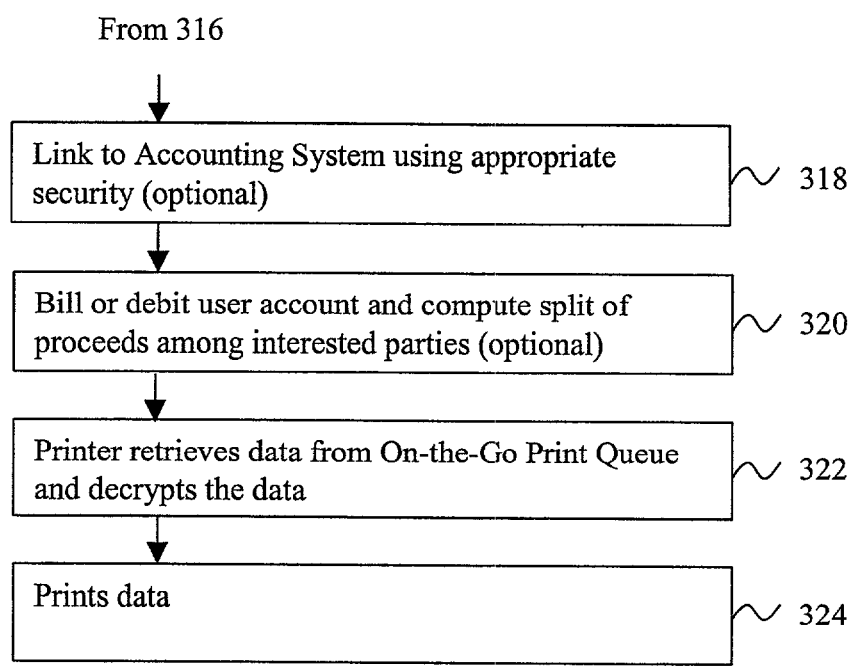

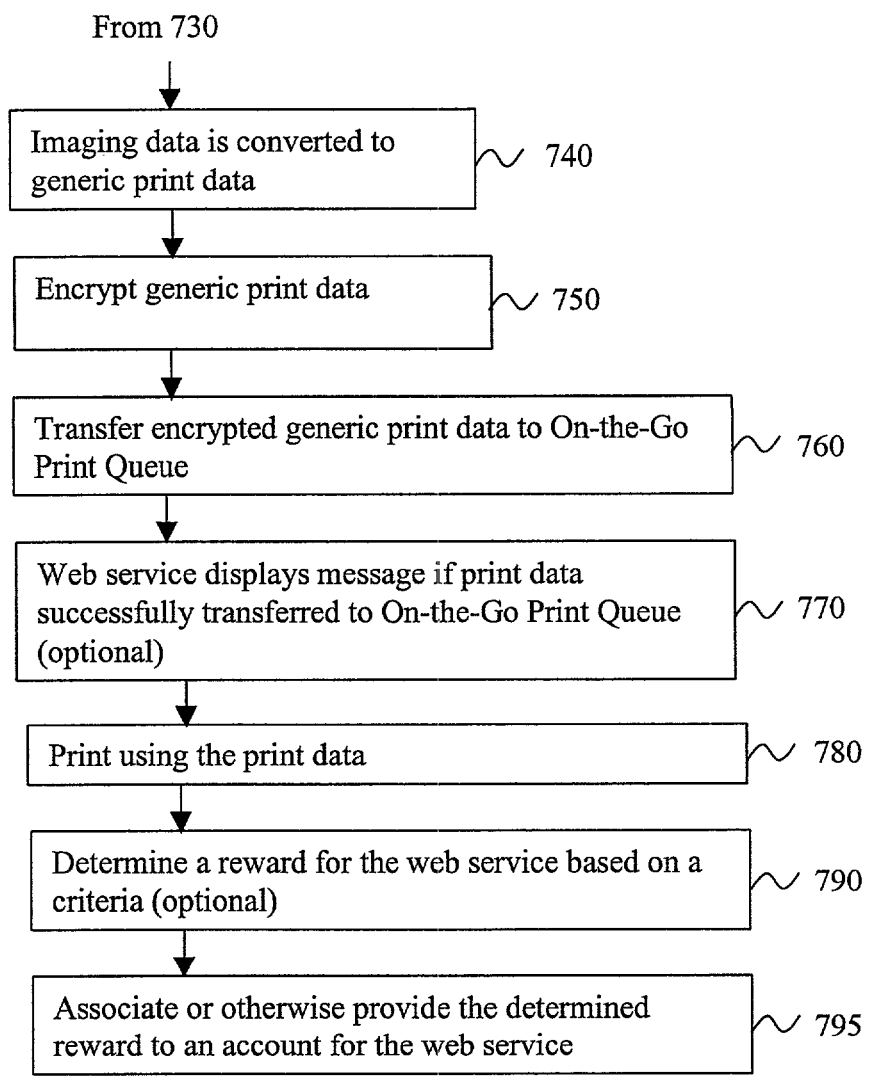
Fig. 7 (contd)

SYSTEM AND METHOD FOR MOBILE PRINTING FROM A DESKTOP OPERATING SYSTEM USING A PORTABLE COMPUTING DEVICE

CROSS-REFERENCE TO RELATED PATENT APPLICATIONS

FIELD OF THE INVENTION

The present invention relates generally to the field of printing, and more particularly, to the field of mobile web based printing.

BACKGROUND OF THE INVENTION

For mobile users there are frequent occurrences when a printing device may not be readily available, but the user has an impulse to print. For example, although a printer may not be available on an airplane, during the course of a long flight a user may have a desire to print several times.

Current solutions to a different problem include a service called Instant Delivery, which provides a customized "newspaper" delivered to a printer. The Instant Delivery service pulls content down from a service located on the public Internet and then prints that content. Instant Delivery is intended to be a replacement for the daily newspaper. However, the Instant Delivery service does not use encryption technology as part of the service, and does not make use of smart card or other portable computing devices.

A second service currently available is PrinterON, which provides a directory of public printers and uses the IPP protocol to print to these public printers through a firewall. The IPP protocol used by PrinterON is based on HTTP, which enables the originator of the print job to send print data through a firewall.

A further service in the prior art is Nadio.com, which provides a remote printing solution that allows both a client and a printer to be behind two distinct firewalls. Print data is encrypted in Nadio.com on a source machine and transported using HTTP through a firewall to a service on the public Internet. This service is periodically polled by another service running behind a firewall on a destination machine. The destination machine uses HTTP to poll the service running on the public Internet for jobs to be printed. However, the Nadio.com service uses printer-specific queues to facilitate its operation.

Hewlett Packard also has a technology coalition referred to as JetCAPS that develop solutions for LaserJet printers. One such solution provides a means for storing encrypted print jobs on a hard disk contained in a printer. This JetCAPS solution allows the use of a smart card in order to decrypt and print the encrypted job on the hard disk contained in the printer.

Accordingly, there continues to be a problem in the industry relating to providing convenient, printer-independent printing solutions for a mobile user.

SUMMARY OF THE INVENTION

Briefly, the present invention comprises, in one embodiment, a method for mobile printing, comprising the steps of: obtaining a portable computing device with a reference to a printer-independent On-the-Go-print queue on the Internet; obtaining print data; and transferring the print data to the On-the-Go Print Queue on the Internet.

In a further aspect of the present invention, the step is provided of accessing the On-the-Go Print Queue to set at least one storage or print parameter.

In a further aspect of the present invention, the parameter is the ordering or deletion of print jobs.

In a further aspect of the present invention, the step is provided of converting the print data to generic print data; and wherein the transferring step comprises transferring the generic print data to the On-the-Go Print Queue.

In a further aspect of the present invention, the step is provided of encrypting the print data; and wherein the transferring step comprises transferring the encrypted print data to the On-the-Go Print Queue; and wherein the obtained computing device includes a key for decryption recorded therein.

In a further aspect of the present invention, the encrypting step comprises the steps of: encrypting with a session key; and encrypting the session key using a public key.

In a further aspect of the present invention, the encrypting step is performed using a public key from a public key-private key pair; and wherein the key for decryption is the private key.

In a further aspect of the present invention, the step is provided of displaying a message to the user if print data was successfully submitted to the On-the-Go Print Queue.

In a further aspect of the present invention, the portable computing device is a smart card.

In a further aspect of the present invention, the step is provided of displaying on a display of the computing device queued print jobs for a user; and displaying a prompt to make a selection of at least one print job to be printed.

In a further aspect of the present invention, the step is provided of displaying on a display screen of the computing device queued print jobs for a user; displaying a prompt to select a management function to perform on the queued print jobs; receiving a selection of a management function; and performing that management function.

In a further aspect of the present invention, the management function is reordering print jobs in the On-the-Go Print Queue.

In a further aspect of the present invention, the management function is deleting a print job from the On-the-Go print In a further embodiment of the present invention, a method is provided for On-the-Go printing, comprising the steps of: retrieving from a portable computing device a reference to an On-the-Go Print Queue located at a site on the public Internet; accessing the On-the-Go Print Queue; obtaining print data from the On-the-Go Print Queue; and printing using the print data.

In a further aspect of the present invention, the obtaining print data step includes the step of displaying on a display queue print jobs for a user; and displaying a prompt to make a selection of at least one print job to be printed.

In a further aspect of the present invention, the displaying steps are performed on a front panel display of a printer.

In a further aspect of the present invention, the obtaining step includes the step of displaying on a display print parameter options.

In a further aspect of the present invention, the obtaining print data step includes the step of displaying on a display screen queued print jobs for a user; displaying a prompt to select a management function to perform on the queued print jobs; receiving a selection of a management function; and performing that management function.

In a further aspect of the present invention, the management function is reordering print jobs in the On-the-Go Print Queue.

In a further aspect of the present invention, the management function is deleting a print job from the On the-Go Print Queue.

In a further aspect of the present invention, the obtaining data step includes the step of displaying account information on the cost of printing the print job.

In a further aspect of the present invention, the step is provided of linking to an accounting system to bill/debit a user account for the cost of printing.

In a further aspect of the present invention, the accounting system computes a split of any proceeds from the bill/debit step among at least two other parties.

In a further aspect of the present invention, the accessing the On-the-Go Print Queue further comprises the step of providing a security ID that is separate from the smart card to the On-the-Go Print Queue to obtain access thereto.

In a further aspect of the present invention, the obtaining print data step includes the step of providing proof of printer authenticity to the On-the-Go Print Queue.

In a further aspect of the present invention, the retrieving step includes the step of validating the identity of a printer.

In a further embodiment of the present invention, a printing method is provided, comprising the steps of: selecting an email message; converting the email message to print data; and transmitting the print data to an On-the-Go Print Queue on the public Internet.

In a further aspect of the present invention, the step is provided of encrypting the print data, and wherein the transmitting step comprises transmitting the encrypted print data.

In a further aspect of the present invention, the step is provided of transmitting the email to a remote Internet service, to perform the converting step; and editing the email at the remote service; and performing the converting step on the edited email at the remote Internet service.

In a further aspect of the present invention, the editing step comprises deleting selected data.

In a further embodiment of the present invention, a method is provided for creating customized imaging data, comprising the steps of: accessing and retrieving based on at least one accessing criterion at least one item of data from at least one Internet web site; converting the item of data to print data; transferring the print data as a print job to an On-the-Go Print Queue on the Internet.

In a further aspect of the present invention, the transferring step comprises the step of determining if a transfer criterion is met and only transferring to the On-the-Go Print Queue if the transfer criterion is met.

In a further aspect of the present invention, the transfer criterion is the inability to transfer the print data to a predetermined Internet location.

In a further aspect of the present invention, the predetermined location is a predetermined printer.

In a further aspect of the present invention, the print data is encrypted prior to the transferring step; and the transferring step comprises transferring the encrypted print data.

In a further aspect of the present invention, the step is provided of the On-the-Go Print Queue automatically deleting a print job after a period of time has elapsed.

In a further aspect of the present invention, the step is provided of automatically replacing a print job with a new print job based on a replacement criterion.

In a further aspect of the present invention, the replacement criterion is that the new print job has the same key words in a title as the print job to be deleted.

In a further aspect of the present invention, the step is provided of presenting a prompt to a user to set a parameter for a print job expiration period of time or a replacement criterion.

In a further embodiment of the present invention, a method is provided for creating customized imaging data, comprising the steps of: a web-based imaging service receiving an access from a user; the web-based imaging service receiving an indication to add graphics from a personal imaging repository of a user to an On-the-Go Print Queue; accessing via a user profile of the user a plurality of different graphics from the personal imaging repository; creating a composition that includes a reference therein for each of the plurality of graphics; converting imaging data for the composition to a desired form; and transferring the converted imaging data to an On-the-Go Print Queue.

In a further embodiment of the present invention, a printing method is provided for a web service comprising the steps of: accessing a source of data; presenting a display indicator for an On-the-Go Print Queue on a web service display; linking via a reference and an encryption key to the On-the-Go Print Queue, when the display indicator is manipulated; generating generic print data from the source of data; and transferring the generic print data to the On-the-Go Print Queue.

In a further aspect of the present invention, the presenting a display indicator step is performed when a print option designation is made by a user.

In a further aspect of the present invention, the step is provided of encrypting the print data with a user's public encryption key; and wherein the transferring step comprises transferring the encrypted print data to the On-the-Go Print Queue.

In a further aspect of the present invention, the step is provided of only presenting the display indicator for the On-the-Go Print Queue if a display criterion is met.

In a further aspect of the present invention, the display criterion is that the user is accessing the web service remotely.

In a further aspect of the present invention, the steps are provided of determining if a source of imaging data is an allowed source for the On-the-Go Print Queue; and preventing data from a disallowed source from being transferred to the On-the-Go Print Queue.

In a further aspect of the present invention, the step is provided of selecting allowed sources from a list of sources for use in performing the determining step.

In a further aspect of the present invention, the determining step includes the step of authenticating the source.

In a further aspect of the present invention, the linking step includes the step of obtaining the reference to the On-the-Go Print Queue and the encryption key from a different service located on the public Internet.

In a further aspect of the present invention, the step is provided of providing a web page to view and administer the user's On-the-Go Print Queue.

In a further aspect of the present invention, the step is provided of determining a reward for the web service based on the transferring to the On-the-Go Print Queue or a further printing step; and associating the reward with an account for the web service.

In a further aspect of the present invention, the step is provided of displaying a message to the user if print data was successfully submitted to the On-the-Go Print Queue.

In a further embodiment of the present invention, program product is provided for mobile printing, comprising machine-readable program code for causing a machine to perform the following method steps: obtaining a portable computing device with a reference to a printer-independent On-the-Goprint queue on the Internet; obtaining print data; and transferring the print data to the On-the-Go Print Queue on the Internet.

In a further embodiment of the present invention, a program product is provided for On-the-Go printing, comprising machine-readable program code for causing a machine to perform the following method steps: retrieving from a portable computing device a reference to an On-the-Go Print Queue located at a site on the public Internet; accessing the On-the-Go Print Queue; obtaining print data from the On-the-Go Print Queue; and printing using the print data.

In a further embodiment of the present invention, a program product is provided including machine-readable program code for causing a machine to perform the following method steps: selecting an email message; converting the email message to print data; and transmitting the print data to an On-the-Go Print Queue on the public Internet.

In a further embodiment of the present invention, a program product is provided for creating customized imaging data, including machine-readable program code for causing a machine to perform the following method steps: accessing and retrieving based on at least one accessing criterion at least one item of data from at least one Internet web site; converting the item of data to print data; transferring the print data as a print job to an On-the-Go Print Queue on the Internet.

In a further embodiment of the present invention, a program product is provided for creating customized imaging data, including machine-readable program code for causing a machine to perform the following method the steps: a web-based imaging service receiving an access from a user; the web-based imaging service receiving an indication to add graphics from a personal imaging repository of a user to an On-the-Go Print Queue; accessing via a user profile of the user a plurality of different graphics from the personal imaging repository; creating a composition that includes a reference therein for each of the plurality of graphics; converting imaging data for the composition to a desired form; and transferring the converted imaging data to an On-the-Go Print Queue.

In a further embodiment of the present invention, a program product is provided for a web service printing method including machine-readable program code for causing a machine to perform the following method steps: accessing a source of data; presenting a display indicator for an On-the-Go Print Queue on a web service display; linking via a reference and an encryption key to the On-the-Go Print Queue, when the display indicator is manipulated; generating generic print data from the source of data; and transferring the generic print data to the On-the-Go Print Queue.

In a further embodiment of the present invention, a computing device is provided for mobile printing, comprising: a reference to a printer-independent On-the-Go-print queue on the Internet; a component for converting print data to a predetermined format; a component for encrypting the converted print data; and a component for transferring the print data to the On-the-Go Print Queue on the Internet.

In a further embodiment of the present invention, a printer is provided for facilitating mobile computing, comprising: a component for accessing the Internet; structure for reading a smart card and obtaining a reference to an On-the-Go print queue on the Internet; a component for accessing the On-the-Go print queue and downloading therefrom print data; and Structure for printing the print data.

DETAILED DESCRIPTION OF THE PREFERRED EMBODIMENTS

Figure 1:
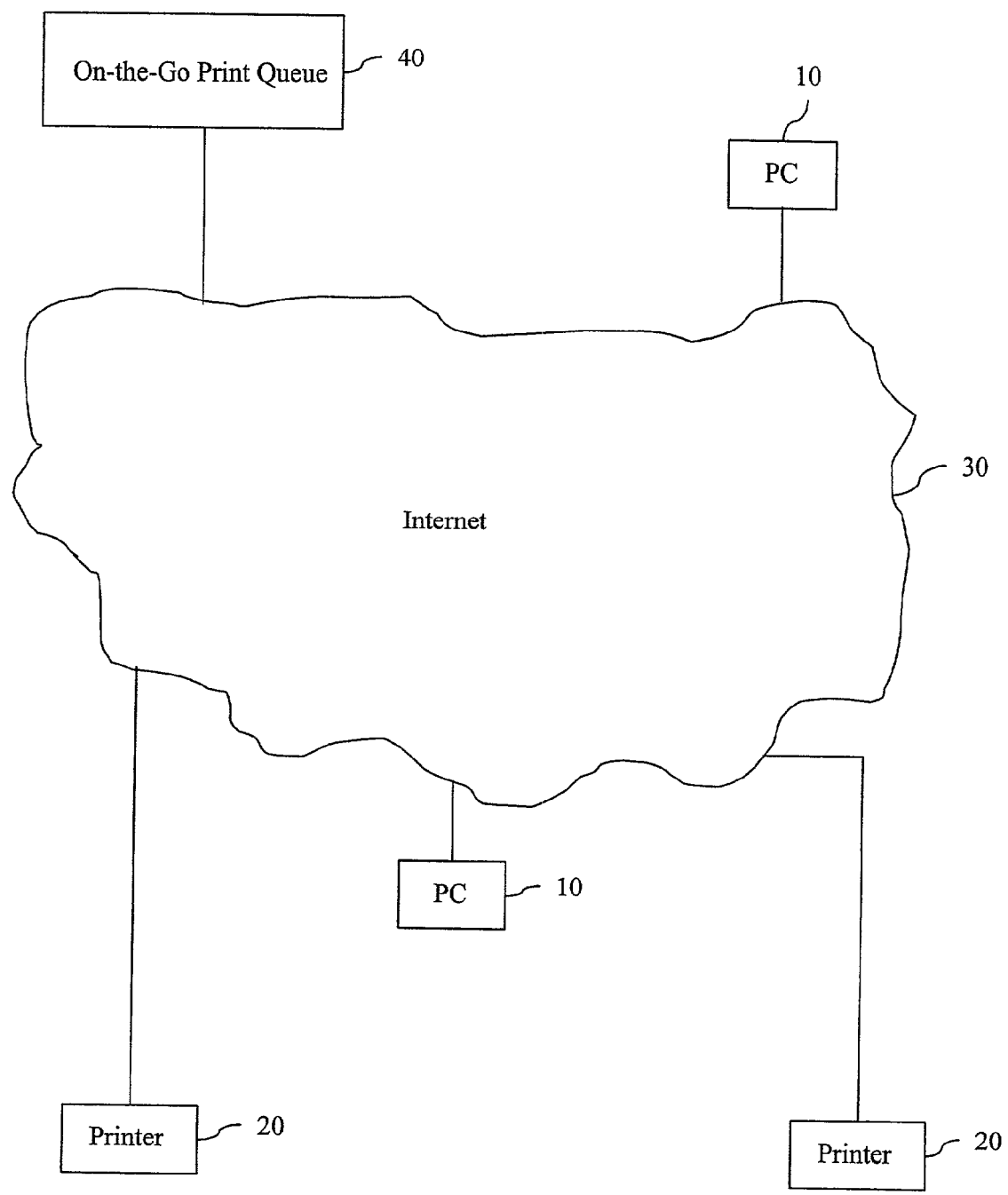
FIG. 1 is a schematic block diagram of an overall system consistent with the present invention.

Referring now to FIG. 1, there is shown a schematic block diagram of an overall system configuration that is consistent with the present invention. In this system configuration, one or more computing devices 10 may be connected to the Internet 30. The term "Internet" is defined to mean a collection of interconnected or disconnected networks (public and/or private) that are linked together by a set of standard protocols (such as TCP/IP) to form a global, distributed network. While this term is intended to refer to what is now commonly known as the Internet, it is also intended to encompass variations which may be made in the future, including changes and additions to existing standard protocols. FIG. 1 further includes an On-the-Go Print Queue 40 and one or more printers 20.

The system is designed to allow a user to transmit data to be printed to the On-the-Go Print Queue 40 via the Internet 30. The print data stored on the On-the-Go Print Queue can later be accessed by the printer 20. In a preferred embodiment, this access to the On-the-Go Print Queue 40 can be accomplished by means of a portable computing device such as a smart card which contains a reference to the On-the-Go Print Queue 40. The portable printing device will be discussed in relation to FIG. 2. In addition, to the reference to the On-the-Go Print Queue 40, in a preferred embodiment, the portable printing device may also include an encryption key such as a private key of a public key pair to facilitate decrypting print data located on the On-the-Go Print Queue 40.

The term "Reference" is intended to be a generic term that includes a URL reference, or in some cases; a pointer, socket number or other backroom detail, to another internal or external location.

The queue 40 may be implemented as a standard queue and may be implemented in a variety of ways. For instance, it could be implemented using a database. Databases provide a convenient mechanism for storing "blobs" of information. A database could be used to service several "queues". A database comprises, in one embodiment, a collection of tables each of which is defined to have a number of fields. Each table has a number of rows which contain the actual data stored in the table. By way of example but not by way of limitation, a database table might include fields such as the time at which the job was submitted, the job data, the queue that the job was submitted to, and various other items of information. The fields of this table could be queried to find the specific user's jobs and these jobs could be ordered according to when they were submitted.

In a preferred embodiment, an On-the-Go Print Queue 40 may be provided by a web service for each of a plurality of users. The term "web service" is intended to refer to a service that is provided (at least in part) by a web server. But a web service is a broader concept than a web server. In this regard, a web server is a program that, utilizing the client/server model and the World Wide Web Hypertext Transfer Protocol, serves files that form Web pages to web users whose computers contain HTTP clients that forward their requests. Every computer on the Internet that contains a Web site must have a Web server program. The most popular web servers currently are Microsoft's Internet Information Server which comes with the Windows NT server, Netscape Fast Track and Enterprise servers, and Apache, a Web server popular on UNIX-based operating systems (but available for Windows as well). Web servers often come as part of a larger package of Internet and Intranet-related programs for serving e-mail, downloading requests for File Transfer Protocol files, and building and publishing Web pages. It is this larger package which is referred to as the web service.

Typically a web service will include a Web site which corresponds to a particular Internet domain name, such as "HP.com", and includes the content associated with one or more particular operations. The term "Web site" is generally intended to encompass both (i) the hardware/software server components that serve informational content over the network, and (ii) the "back end" hardware/software components, including any non-standard or specialized components, that interact with the server components to perform services for the Web site user.

Figure 2:
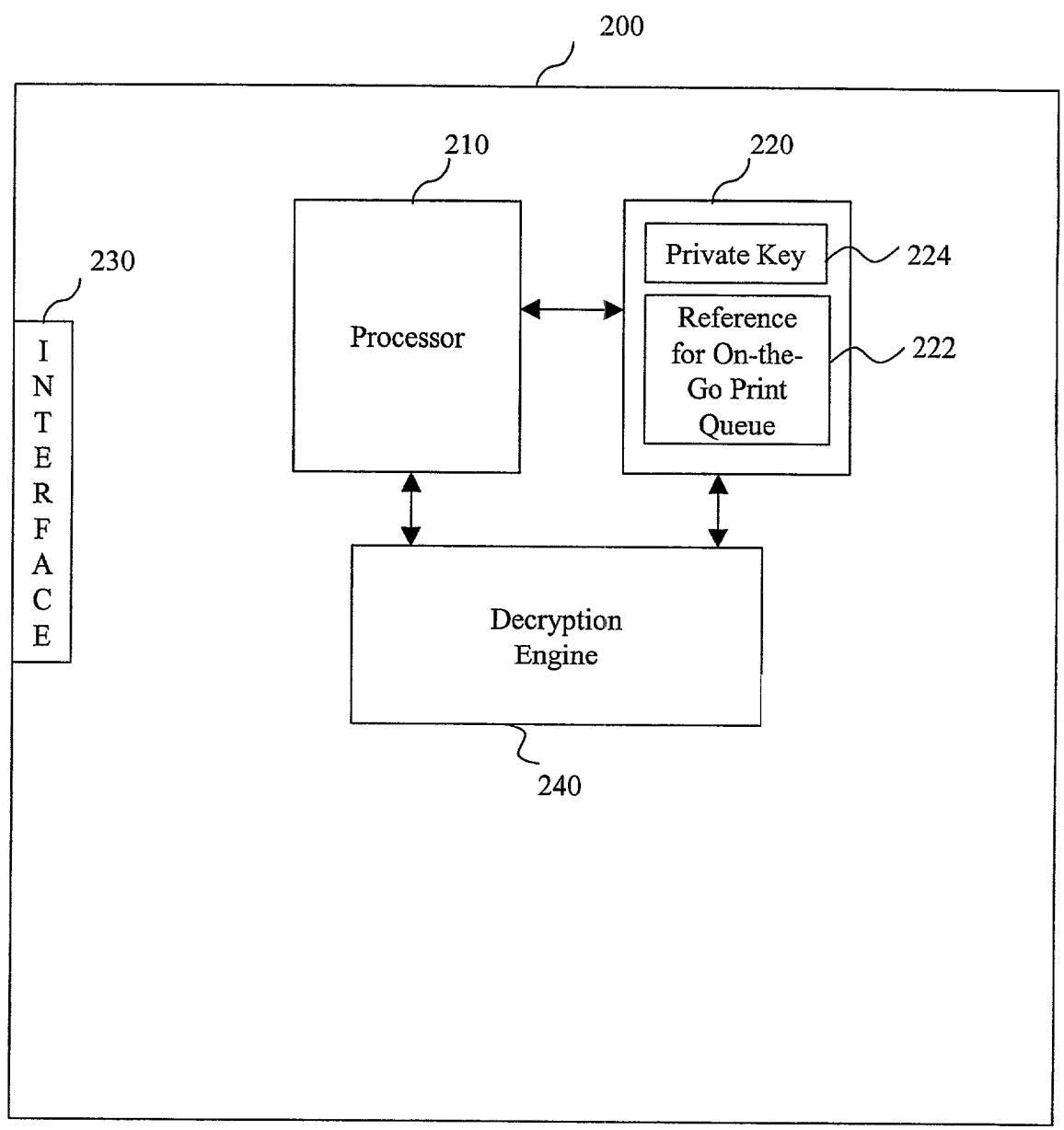
FIG. 2 is a schematic block diagram of a smart card or other portable computing device that is consistent with the present invention.

Referring now to FIG. 2, there is shown a preferred embodiment of portable computing device 200 that may be utilized in accordance with the present invention. The portable computing device 200, which may be implemented as a smart card, a PDA over infrared or other medium, or mobile phones over infrared or other medium for example, or another convenient portable device, contains a processor 210, a memory 220, decryption engine 240, and a communications interface 230. The memory 220 contains a reference 222 for the On-the-Go Print Queue. Additionally, in a preferred embodiment the memory 220 contains a private key for a public key-private key pair. The interface 230 for the portable printing device 200 may comprise standard contact points and the appropriate protocols for communicating with a card reader or other device designed to enable the portable computing device to communicate with the device to which it is attached. Alternatively, or in addition, the interface 230 may also include a wireless interface, such as a magnetically coupled interface in accordance with BlueTooth or Irda.

Figure 3:
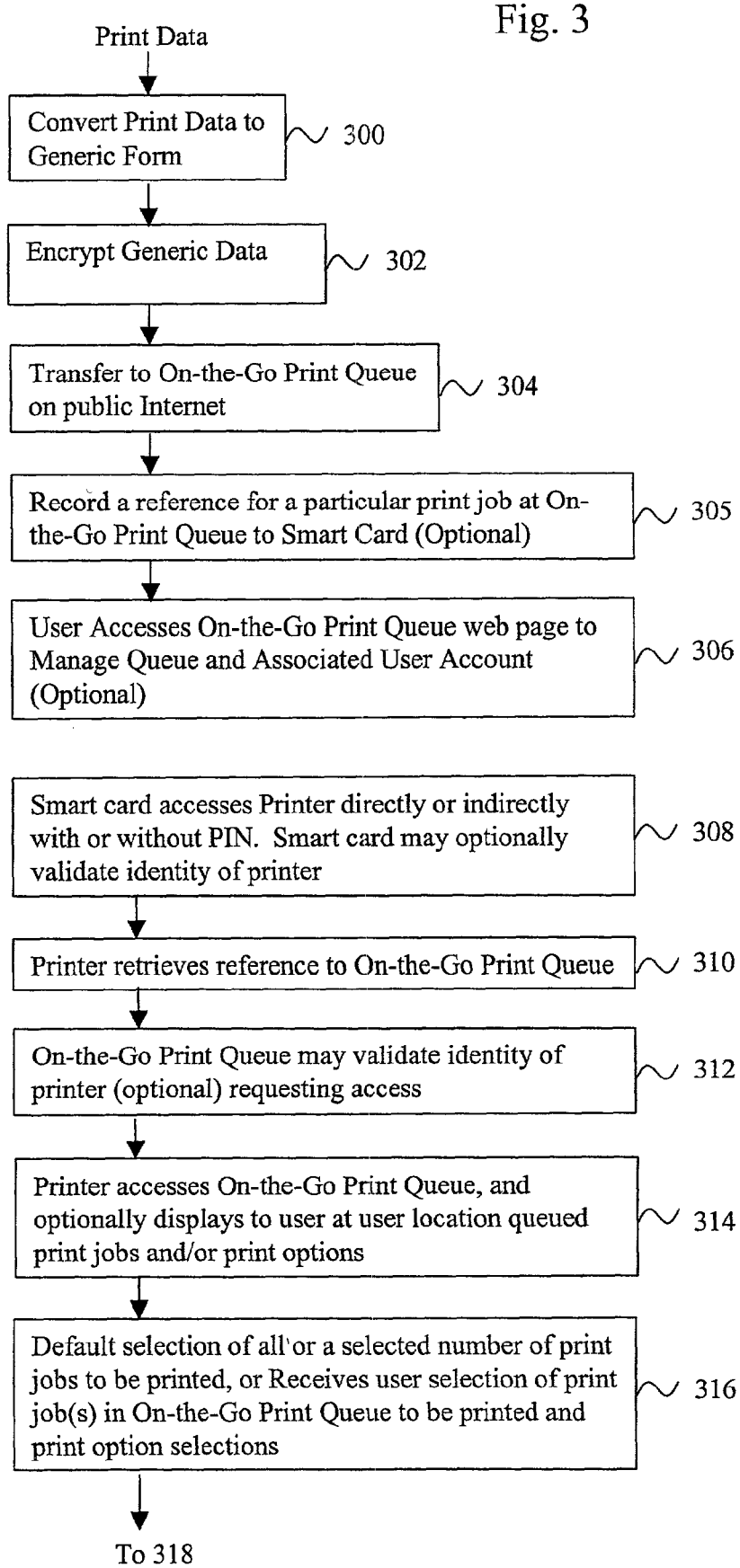
FIG. 3 is a schematic block diagram of a first embodiment of a method in accordance with the present invention.

Referring now to FIG. 3, there is shown a first embodiment of a method consistent with the present invention. In this embodiment, a user desires to print from a desktop application (such as Microsoft Word). In a preferred embodiment of this method, a special printer driver/port monitor is provided which optionally converts print data supplied by the operating system/desk top application program into a generic (i.e., non-printer specific) form. By way of example, such optional conversion could take the supplied print data and convert it into PDF. This optional operation is shown in FIG. 3 by block 300. It should be noted that if the ultimate destination matches the output of a driver installed on the desktop computing system, conversion to a standard format is not required. However, potential destinations for the output data are limited to only those capable of correctly processing the non-standardized output of the printer driver.

The printer driver/port monitor also optionally encrypts the generic print data. The use of encryption implements an important optional theme in this application, which is that the data is conveyed to and from the queue in a manner impervious to inspection to unauthorized parties. This operation is represented by block 302. In a preferred embodiment, a public key-private key encryption is utilized. Accordingly, the encryption step in block 302 is performed using the user's public key. In an alternate embodiment of this encryption step, the generic print data may be encrypted with a session key (symmetric key) and the session key may then be encrypted using the user's public key and used as a preface for the generic print data. This session key encryption (which is typically used in cryptography applications) retains the security of a public key system, while gaining the performance of a symmetric key system.

The next step in the method, represented by block 304, is to transfer this resulting print data to the user's On-the-Go Print Queue 40 located on the Internet. As noted previously, a reference to the On-the-Go Print Queue 40 is stored in the memory 220 for the portable computing device 200. Thus, the computing device 200 may be utilized to access the On-the-Go Print Queue 40.

In some embodiments of the present invention, an additional reference for the particular print job in the On-the-Go Print Queue 40 may be recorded at the smart card 200. This step is represented by block 305 in the figure.

The print data (which may be generic print data and may be encrypted) which is stored in the user's On-the-Go Print Queue 40 can be printed later using the portable computing device 200 and a printer. As noted above, the portable computing device 200 contains a reference 222 to the user's On-the-Go Print Queue 40. The portable computing device 200 also contains the private key corresponding to the user's public key which was optionally used to encrypt the print data in block 302. Additionally, as noted previously, the portable computing device 200 will contain embedded logic, referred to in FIG. 2 as the decryption engine 240 to decrypt the print data without revealing the user's private key.

In operation at the printer, the portable computing device 200, in a preferred embodiment a smart card, is inserted into a printer that supports the present invention, e.g., a printer that has Internet access capabilities, and is programmed to read the On-the-Go Print Queue reference in the smart card and then retrieve and decrypt the print data from the On-the-Go Print Queue 40. The steps of retrieving the reference from the smart card, accessing a web site on the Internet, downloading data from that web site on the Internet, and decrypting that data, are steps within the skill of the art to program.

Referring again to FIG. 3, in block 308 a user utilizes the portable computing device/smart card 200 to access and establish a communication link directly or indirectly with a printer. This computing device access to the printer 20 may require a PIN or some other additional identification. The computing device/smart card 200 may also optionally validate the identity of the printer 20 in this step using standard validation techniques. This validation is to ensure that the printer is a proper part of a given network and/or has appropriate security, or meets other requirements. Such validation is to prevent a bogus printer from gaining access to print data on a network. This validation would preferably be performed using public key authentication schemes where the printer demonstrates that it possesses the private key corresponding to a public key signed by some trusted authority (i.e. certificate).

Once communication between the computing device 200 and the printer 20 has been established, the printer 20 retrieves the reference 222 for the On-the-Go Print Queue 40. This operation is performed in block 310.

Figure 8:
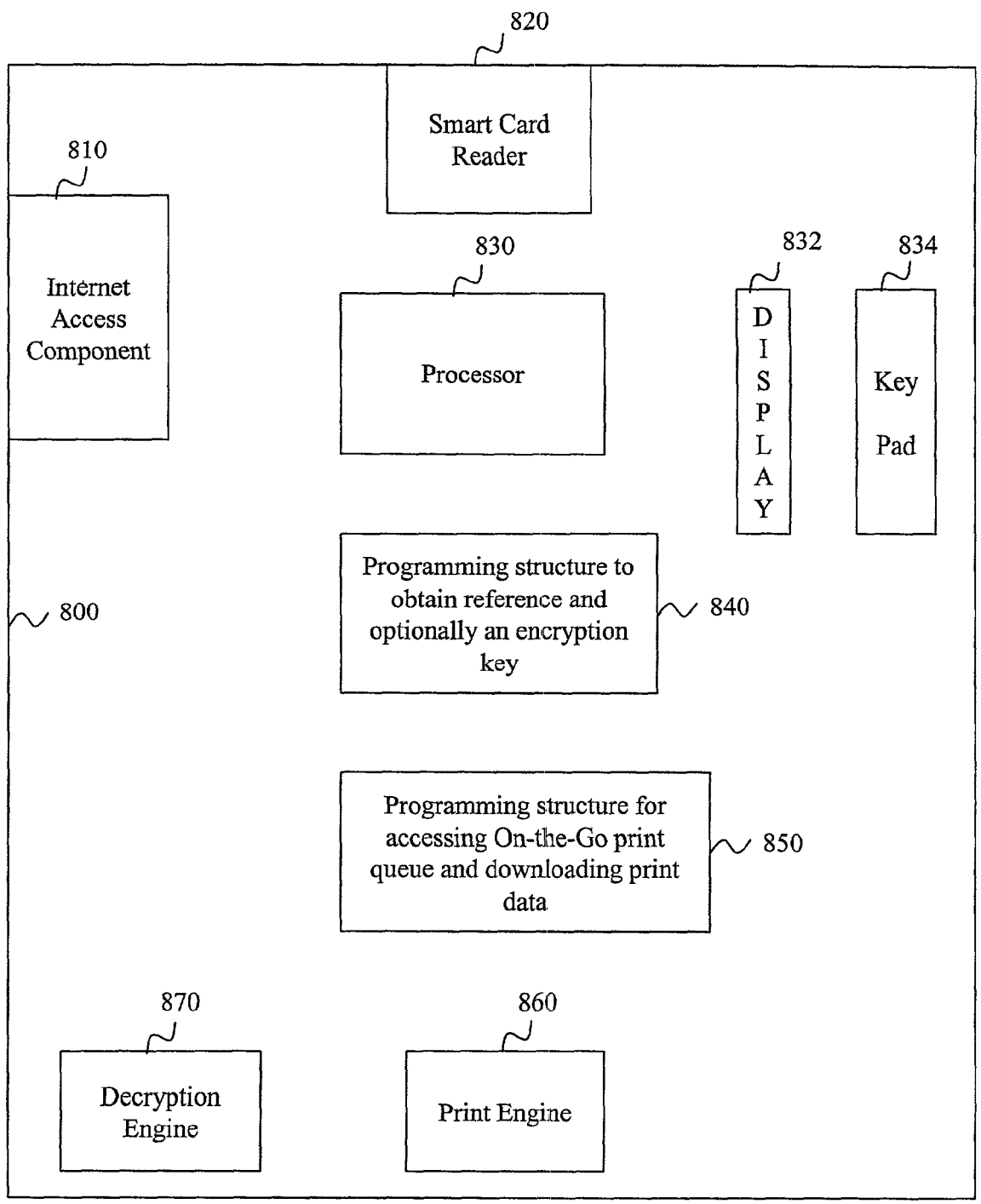
FIG. 8 is a schematic block diagram of a preferred embodiment of a printer consistent with the present invention.

Referring to FIG. 8, there is shown an example printer 800 for facilitating this mobile printing and the step to be discussed below. Such a printer would comprise, in a preferred embodiment, a component 810 for accessing the Internet which may include browser software and an TCP/IP hardware protocol stack. The printer would also comprise a structure 820 for reading information from a portable computing device, which may be implemented via a wireless, magnetic, or other convenient reading mechanism. In a preferred embodiment, the reading mechanism would comprises a smart card reading mechanism, which could comprise a slot with a magnetic card reader. The printer 800 would also necessarily include a processor 830 and a user interface, which may include a display 832 and/or a key pad 834, or another convenient interface. The printer 800 would also include programming code structure 840 for obtaining a reference to an On-the-Go print queue on the Internet. The printer 800 would also include programming code structure 850 for accessing the On-the-Go print queue and downloading therefrom print data. The printer 800 would also include a print engine 860 for printing the print data. Optionally, as discussed below for a preferred embodiment, the printer would include a decryption engine 870 for decrypting the print data downloaded from the On-the-Go print queue.

Optionally, the On-the-Go Print Queue 40 may validate the identity of the printer 20 that is requesting access. This step is represented by block 312. This validation step may be accomplished for example, by the printer 20 proving that it has a private key corresponding to a digital ID certified by a trusted certificate authority. This operation may be accomplished by the printer 20 responding to a challenge, wherein the printer 20 is asked to digitally sign random data using the private key. The On-the-Go Print Queue 40 then validates the digital signature using the corresponding public key for that printer. Such standard challenge-response protocols to establish authenticity are within the skill of the art to program.

Referring now to block 314, assuming that the proper optional validation has occurred in the previous steps, the printer accesses the On-the-Go Print Queue 40. In a preferred embodiment of the present invention, a web interface may be provided on the display 832 of the printer 20 or at some other convenient location which displays to the user at the user's location pending print jobs option (i.e., print data to be printed) and/or print options. This display interface would provide the functionality to remove print jobs, reorder print jobs, provide account information (such as what has been printed to date, when that printing took place, where that printing took place, and how much that past printing cost. Additionally, the number of pages for each different pending print job could be displayed, as well as the time required to perform the printing operation and the cost of the printing operation for each of the print jobs in the queue.

In yet a further embodiment of the block 314, the display to the user could include various printing options such as, for example, the paper size, the size of the font, the font type, the paper type, and various other options. Web content could receive the user's selections from these various printing options through the front panel display, for example by clicking a mouse or touching a touch pad on the display or through some other convenient indication.

Referring now to block 316, a default print job selection could automatically select printing for one or more print jobs in the On-the-Go Print Queue. For example, the default selection could select for printing all of the print jobs in the On-the-Go Print Queue 40, or could select for printing only the oldest print job in the On-the-Go Print Queue. Alternatively, in a preferred embodiment the printer could receive the users selection of print jobs in the On-the-Go Print Queue 40 to be printed, and would then print those selected print jobs.

Referring now to block 318, an optional step is to link the system to an accounting system using appropriate security precautions and validations.

After a communication link between the system and the accounting system is established, then a billing or a debit of the user account or another appropriate account may be performed. This step is represented by block 320. Additionally, the proceeds realized from this billing or debit operation could be associated with the appropriate accounts. In one embodiment, the proceeds from the billing or debit operation could be split among two or more of the service provider, the printer owner, the printer maintainer, and/or potentially other parties that have a financial interest in printing as a vended service.

Referring now to block 322, the printer 800 retrieves the data from the On-the-Go Print Queue. In a preferred embodiment where the print data is encrypted generic print data, block 322 operates to decrypt this print data using the decryption engine 240 on the computing device 200 and/or the decryption engine 870 on the printer 800 and the private key 224 stored in the memory 220 of the computing device 200. The are a variety of options for decrypting including the sharing of the decryption task among the decryption engines in order to provide an efficient operation. For example, in the preferred implementation, a session key is decrypted using decryption engine 240 on the computing device 200, and then the decryption engine 870 in the printer 800 decrypts the rest of the encrypted print job using the session key. This arrangement enhances performance.

In a yet further aspect of the present invention, the user's public key and the location of the user's On-the-Go Print Queue 40 may be retrieved by the driver/port monitor on the printer 800 from the computing device/smart card 200. The decryption may then take place either entirely on the decryption engine 870 of the printer 800, or in some shared fashion utilizing the decryption engine 240 on the computing device 200.

Referring to block 324, the print data is then printed by the print engine 860 at the printer 800, or a remote printer, if desirable.

In a further aspect of the present invention, HTTP is used for communication between the client's software and the printer driver/port monitor on the desktop and the print On-the-Go Queue 40 located on the public Internet. This protocol will allow communications through one or more firewalls. For example, in HTTP POST could be utilized to establish a communication through a corporate firewall. Likewise a HTTP GET command could be utilized by the printer to get encrypted data on the On-the-Go Queue 40, which may be behind another firewall.

In yet another aspect of the present invention, the HTTP protocol could be used for communication between the printer and a print On-the-Go Print Queue server located on the public Internet. As noted the HTTP GET command would allow communication through a firewall to the On-the-Go Queue 40.

Accordingly, it can be seen that the present invention can allow a user to choose what to print, when to print, and at what printer. This facility is advantageous because a printing device may not be readily available when the user has the impulse to print. For example, a printer may not be available on a plane and over the course of a long flight the user might have the desire to print several times. Thus, the invention allows a user to initiate printing when it is convenient for the user. Additionally, the present invention allows the initiation of the actual printing process without the need for a laptop, cell phone or a PDA. The user can simply insert a credit card sized smart card into a slot into a printer in order to initiate the printing process. Alternatively, the user could initiate the printing process by transmitting a signal from the user's special purpose computing device to the printer or could communicate with the printer via magnetic coupling or some other form of wireless coupling. The only requirement, is the that printer be configured to be able to access the Internet, and that the printer is properly programmed in order to obtain the reference to the On-the-Go Print Queue 40 via the communication with the smart card or other special purpose computing device of the user.

Additionally, in one aspect of the present invention, a simple security model may be used to provide military grade encryption. Print data is encrypted on the user's client, e.g., the user's desktop (which presumably is trusted), and then decrypted on the smart card or other special purpose user device at the printer 20 program (which is presumably partially trusted).

Accordingly, the present invention may be used to facilitate an On-the-Go Queue subscription service and a printer subscription service under a business model where usage drives revenue.

Figure 4:
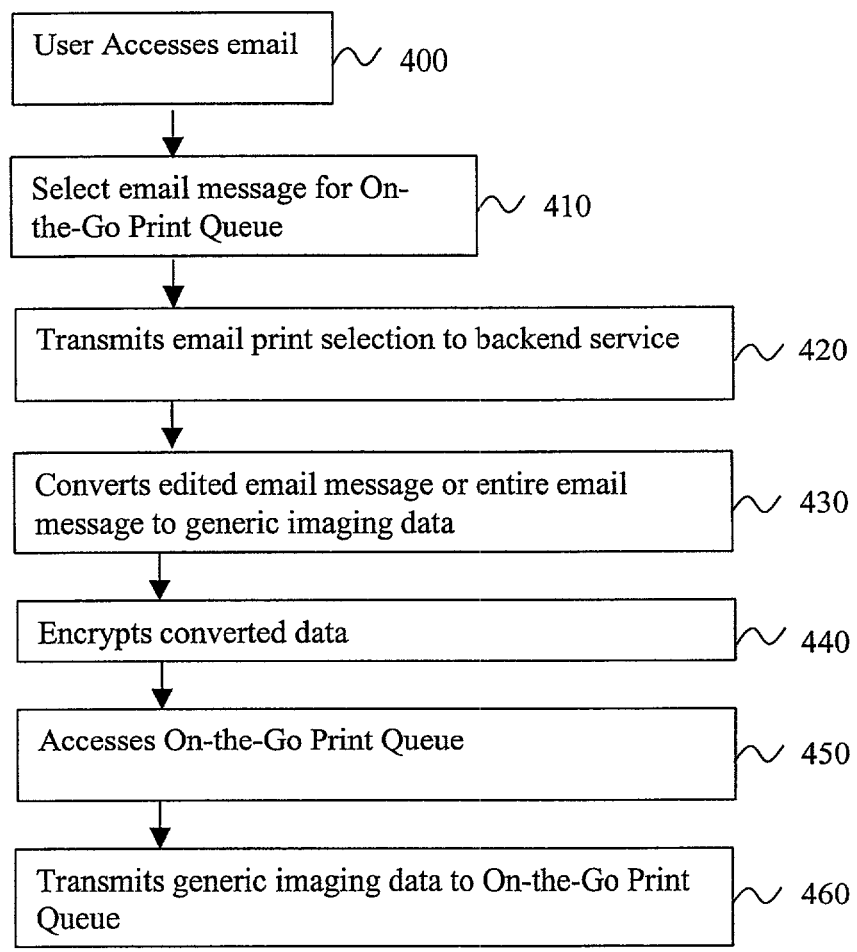
FIG. 4 is a schematic block diagram of a second embodiment of a method in accordance with the present invention.

In a further embodiment of the present invention, the user of a connected email device may select what it is they want to print when there is not a printer available, and then actually print when the user encounters a printer. Referring now to FIG. 4, a user may access or browse his/her email messages using a connective email device (e.g., RIM's Blackberry device, HTTP://www.blackberry.net), as represented by block 400.

Referring to block 410, the user selects one of the email messages in his/her email, and indicates a desire to print that email message.

Referring to block 420, an indication of the email message selected is transmitted to a backend service, which may or may not have provided the email information to the connected email device. This service has full access to email messages. By way of example but not by way of limitation, such a backend service could be set up to screen email messages to the connective email device according to a user criteria, such as size or the email sender, and may even edit the email message, such as by sending only the first page of the email message.

Referring now to block 430, the backend service receives the email print selection and processes the print request by converting the selected email message in its edited form or converting the entire email message into generic imaging data suitable for use with the On-the-Go Print Queue 40 service.

Referring now to block 440, the backend service may optionally encrypt the generic imaging data, for example, by using the user's public key.

Referring now to block 450, the backend service then accesses the On-the-Go Queue 440 by using a reference to it stored at the backend service, or obtained from the connected email device.

Referring now to block 460, the backend service then transmits the generic print data or an encrypted version of the generic print data to the On-the-Go Print Queue 40. This imaging data can be subsequently printed by using a smart card or other special purpose computing device, as described previously for FIG. 3. This embodiment of the invention offers the advantage of not requiring the user to be near a printer when selecting what to print. Unlike the print-by-reference technique, the user is not required to be present at the printer in order to choose what is to be printed. In the print-by-reference technique, a URL or other reference is transmitted to the printer which subsequently fetches the data associated with the URL or other reference, converts it into a form suitable for printing, and prints the data.

Figure 5:
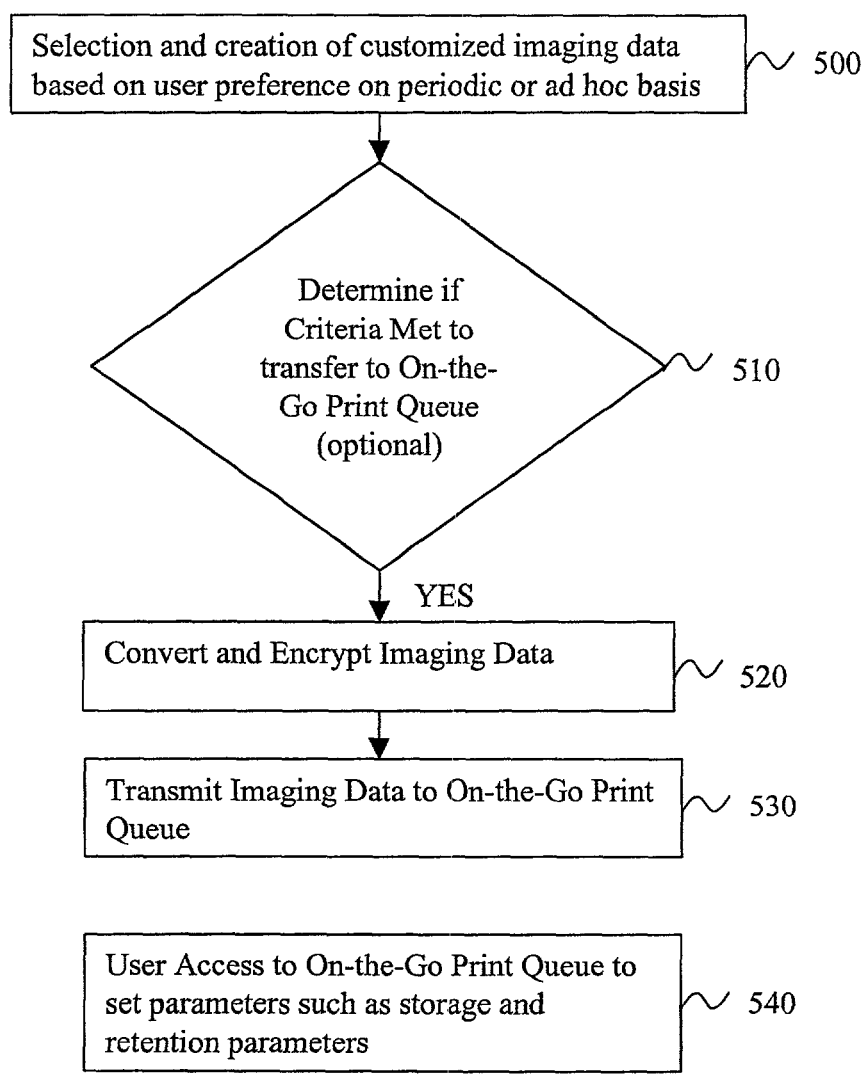
FIG. 5 is a schematic block diagram of a third embodiment of a method in accordance with the present invention.

FIG. 5 discloses a further embodiment of the present invention wherein a daily newspaper or other periodic information may be printed while traveling. This embodiment uses a Web service on the public Internet to create customized imaging data based on user preferences on a periodic basis. Referring to the figure, block 500 indicates an automatic selection and creation of customized imaging data based on user preferences on a periodic or an ad hoc basis. By way of example, but not by way of limitation, this Web service could be accomplished by scanning the titles or the full text articles and other information in one or more databases and selecting, accessing, and copying, or referencing the selected articles that contain key words set in the user preferences. This process could also entail editing the selected articles or other information based on a criteria. For example, the editing could encompass copying only selected portions of articles, such as a title and table of contents, or editing such as the first one or more pages in the article.

Referring now to block 510, an optional criteria may be set to determine if the selected articles should be sent to the On-the-Go Print Queue 40. By way of example, such a criteria might be an inability by the backend service to deliver the periodic article imaging data from block 500 to another source, such as a printer at the user's office. This inability might be caused by the user or another turning off the printer because they are traveling. Other criterion may be utilized to trigger the periodic imaging data being sent to the On-the-Go Print Queue 40, as desired. Accordingly, the block 510 determines if the optional criteria has been met to transfer the imaging data to the On-the-Go Print Queue 40.

Referring now to block 520, the imaging data may be optionally converted to generic print data, and may be optionally encrypted, as discussed previously for other embodiments.

Referring now to block 530, the backend service may access the On-the-Go Print Queue 40 by means of a reference thereto and then optionally convert and/or encrypt the print/imaging data prior to transmitting the data to the On-the-Go Print Queue 40. This imaging data may then be subsequently printed using a smart card or other portable computing device 200, as described for previous embodiments of the present invention.

It should be noted that in order to facilitate the forgoing operation, the user has, through an earlier interaction, supplied his/her preferences, a reference to his/her On-the-Go Print Queue 40, and a public key where optional encryption is utilized, to the Web or network service. In a preferred embodiment, the Web or network service would provide a Web interface on the user's browser for performing this configuration step.

Referring now to block 540 the user may also access the On-the-Go Print Queue 40 to set various parameters such as storage and retention parameters. By way of example, but not by way of limitation, the user can set an expiration date time period, e.g., one month, at the queue service in order to cause the imaging data to be automatically deleted from the On-the-Go Print Queue 40 when that time period has expired, without requiring user interaction. In a further aspect of this block 540, the user could set the queue service to replace existing imaging data with new imaging data based on a pre-determined criteria previously set by the user. In a further aspect of an implementation of block 540, the expiration and replacement policy is configurable, meaning that the end-user or another has the ability to interactively determine the policy used to determine the expiration period as described earlier in this same paragraph. For example, an expiration policy could comprise putting the item in a "deleted" folder or sending it back to the user. The replacement policy deals with sending an updated version of a document or image to the printer. The expiration policy, in contrast, deals with what is done with the older version of the document or image, which could be controlled by the user.

Accordingly, this embodiment of the present invention facilitates the user obtaining relevant periodic information (like a newspaper) when the user is traveling. The user need only insert his smart card into a printer or otherwise initiate a communication with the printer through another portable computing device to cause communication with the printer to obtain their "daily addition" of this periodic information.

Figure 6:
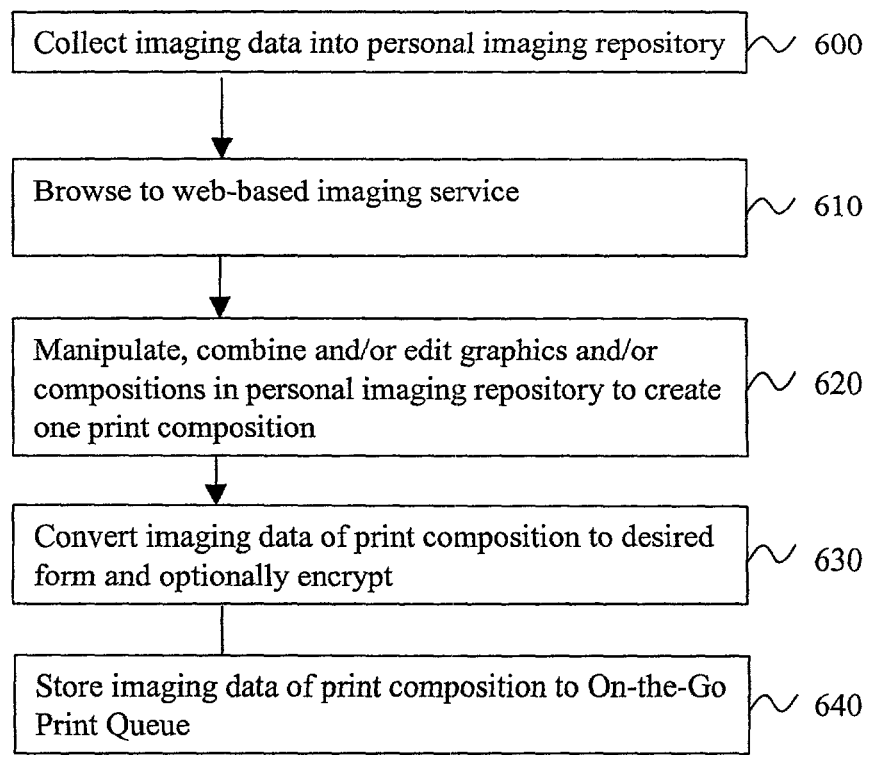
FIG. 6 is a schematic block diagram of a fourth embodiment of a method in accordance with the present invention.

Referring now to FIG. 6, a further embodiment of the present invention is disclosed. This embodiment is premised on the Web based imaging service and the attendant personal imaging repository, user profile, graphics, and composition concepts disclosed in U.S. patent application Ser. Nos. 09/923,954 filed Aug. 8, 2001; 09/924,057 filed Aug. 8, 2001; 09/923,328 filed Aug. 8, 2001; 09/923,337 filed Aug. 8, 2001; 09/923,325 filed Aug. 8, 2001; 09/923,967 filed Aug. 8, 2001; 09/923,969 filed Aug. 8, 2001; 09/940,596 filed Aug. 29, 2001; 09/924,058 filed Aug. 8, 2001; 09/923,955 filed Aug. 8, 2001; 09/924,060 filed Aug. 8, 2001 from Hewlett Packard Company. The patent applications are hereby incorporated by reference into the present application.

Referring now to block 600, the user collects and stores imaging data in the user's personal imaging repository. The definition for "personal imaging repository" in these applications is a conceptual term describing the exchange infrastructure used to exchange graphics, compositions and graphics data with Web services. Users are associated with their graphics data through user profiles. As noted in these applications, the personal imaging repository can represent any type or combination of data storage devices.

The term "graphics data" refers to digital data capable of being represented as two or more dimensional graphics, such as a portable document format ("PDF") file or a joint photographic experts group ("JPEG") file.

The term "composition" refers to a file with links to graphic data serviced as a single unit, i.e., a graphic. The file also usually includes information on the placement of those graphics on a sequence of canvasses, e.g., pages. It describes how to combine one or more graphics from one or more sources onto a sequence of canvasses, in a variety of different ways. The use of compositions allows multiple compositions to reference a graphic in a graphic store without having to duplicate the graphic.

The term "graphics store" refers to a network service or a storage device for storing graphics data that can be accessed by the user or other network services. The graphics data store preferably accepts the graphics data in multiple standard file formats, and can convert the graphics data into these file formats as needed, depending on the implementation.

The term "user profile" typically includes user identification information and one or more references that are to be used in a particular context. By way of example, there could be an internal user profile that includes a reference to a default composition store, a reference to a default graphics store, and a reference to a default composition within a composition store. Likewise, there could be an external user profile for use when the user is outside of a firewall. This external user profile could contain a reference to a default composition store, a reference to a default graphic store, and a reference to a default composition. Each of these references could be to storage on different servers both inside and outside of a firewall.

The term "composition store" refers to a service (ideally implemented as a network service) that stores and provides access to imaging compositions that can be accessed by the user or Web services. In this context, providing "access" includes providing methods for building compositions, modifying compositions, and accessing them piecemeal. For example, a set of methods available for execution via the composition store might include the methods Get a Composition, Create a Composition, Delete a Composition and Modify a Composition.

Referring now to block 610, the user browses to a Web-based imaging service that provides a means of adding imaging data to the On-the-Go Print Queue 40, and provides an interface to allow the user to indicate a desire to add particular imaging data to their On-the-Go Print Queue 40. Accordingly, this Web-based imaging service would include a reference to the On-the-Go Print Queue 40, and an appropriate user interface screen to allow the user to make an indication to activate a method to add particular imaging data to the On-the-Go Print Queue 40.

Referring now to block 620, the user can use the Web-based imaging service to manipulate, combine and/or edit graphics and/or compositions in his/her personal imaging repository to create one print composition. For example, graphics could be obtained from a variety of different Web services and placed in the user's personal imaging repository. These different graphics on one or more different servers could then be placed in a single composition to create imaging data for that composition. In one embodiment, the composition composed of documents or graphics from several different sources could have a watermark added thereto.

Referring now to block 630, either before or after the creation of the composition the graphic data comprising the composition may be converted into generic imaging data or other convenient imaging data and may be optionally encrypted. This conversion and/or encryption step may be performed as described for previous embodiments.

Referring now to block 640, the Web-based imaging service could then access the On-the-Go Print Queue 40 by means of a reference thereto and transmit the imaging data for the print composition to the On-the-Go Print Queue 40. This print job on the On-the-Go Print Queue 40 can be subsequently printed using the smart card 200 or other portable computing device as described previously.

Accordingly, it can be seen that this Web-based imaging embodiment provides a method and system for sharing imaging information between Web services. Through the Web-based imaging, it is possible to have a variety of Web services collaborate in the creation of the imaging data for a composition. This embodiment describes a method and a system of connecting the On-the-Go Print Queue 40 service into this Web-based imaging architecture. The combination of the Web-based imaging service and the On-the-Go Print Queue service can be accessed by a means of a smart card or other portable computing device to provide a bridge to a convenient and secure model of printing.

Figure 7:
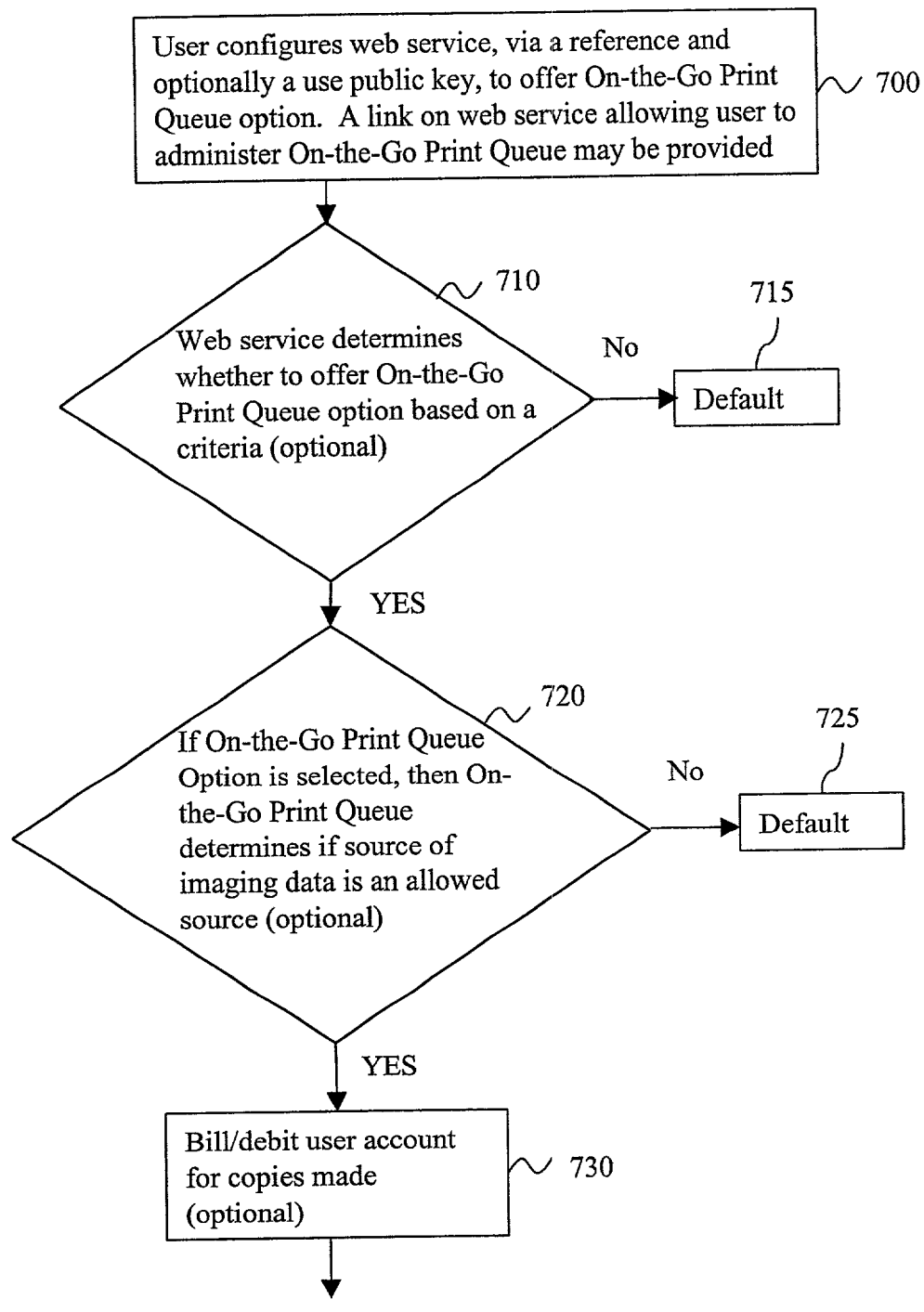
FIG. 7 is a schematic block diagram of a fifth embodiment of a method in accordance with the present invention.

Referring now to FIG. 7, there is enclosed a yet further embodiment of the present invention based on a user configuration of a Web service. Referring now to block 700 in the figure, FIG. 7, a user configures a Web service (e.g., My Yahoo) to use the On-the-Go Print Queue service. This user configuration step is accomplished by providing the Web service with a reference to the user's On-the-Go Print Queue 40, and in a preferred embodiment, the user's public key. In a preferred embodiment of this block 700, the Web service also provides a link to a Web page that allows the user to view/administer the user's On-the-Go Print Queue 40. The URL or other reference for this Web page would be provided at the same time as the user information that includes the reference to the overall On-the-Go Print Queue 40 and optionally the user's public key. As noted for previous embodiments, the viewing/administering Web page for the On-the-Go Print Queue 40 could allow the user to manipulate the various print jobs in the queue, such as for example, by deleting a print job, or changing the order of the print jobs, or setting a timing parameter for the print job, or performing some other administrative task.

Referring now to block 710, with the Web service now configured to provide to the user his/her On-the-Go Print Queue service, the Web service may perform the optional step of determining whether to offer the On-the-Go Print Queue option based on a criterion. By way of example, but not by way of limitation, the Web service may only offer the On-the-Go Print service if the user is accessing the service remotely. The Web service could, for example, determine the "remoteness" by storing the user's typical IP Network. If the user is not accessing the Web service using an IP address located on their typical IP network, the user will be considered remote. If the On-the-Go Print Queue option is not provided, other printing alternatives (less relevant to remoteness) might be provided instead. If the web service determines that the criteria is not met, then the process moves to the default about 715. Alternatively, if the criteria for offering the On-the-Go Print Queue service is met, then the web service displays an On-the-Go Print Queue icon or other indication which may be designated by the user, or simply causes the designation of a print command to indicate the On-The-Go Print Queue, and the process moves to block 720.

Block 720 is an optional block which determines if a source of imaging data is an allowed source. By way of example but not by way of limitation, an allowed source of imaging data might be verified through cryptographic authentication. The user would typically indicate which services are allowed sources that may submit print jobs. This user indication of allowed sources could be accomplished by the user selecting them from a list provided by the On-the-Go Print Queue 40 service, for example through a web interface, or by inputting selected allowed sources. In operation, the On-the-Go Print Queue or the web service would compare the source of the imaging data to the set of allowed sources, and only transmit and/or store the imaging data if it is from an allowed source on the list. If the source of the imaging data does not match a source in the list of sources, then the process moves to the default block 725. Alternatively, if the source of the print data is an allowed source, then the process moves to block 730.

Block 730 represents a further optional aspect of the present invention. In block 730, the user's account may be automatically billed or debited for copies to be made via the On-the-Go Print Queue service. Such billing/debiting could be performed by either the web site, or the On-the-Go Print Queue service, or by another convenient web service, by sending a communication of the bill/debit to an appropriate location to access the user account.

Referring now to block 740, when the user selects the On-the-Go Print Queue option, (by clicking on a hyperlink or by some other means), and assuming that any optional criteria have been met in blocks 710 and 720, then the web service converts the imaging data to generic print data.

Referring now to block 750, the web service may optionally encrypt the converted imaging data using the user's public key, or via some other convenient method, as described for previous embodiments.

Referring now to block 760, the web service transfers the print data, which may be encrypted, to the user's On-the-Go Print Queue 40 via the previously noted reference. Thus, the print job can be subsequently printed using a smart card 200 or other convenient portable computing device to communicate with a printer, as described for previous embodiments.

Referring now to block 770, in a preferred embodiment the web service displays a message to the user if the print data has been successfully transferred to the On-the-Go Print Queue. This message could be triggered to be displayed by the receipt by the web service of an appropriate signal from the On-the-Go Print Queue 40.

Referring to block 780, the subsequent actual printing of the print data is represented by this block.

Referring to block 790, a reward may be determined for the web service, or the originator of the print data, or for another appropriate party based on a criterion. For example, a reward could be determined for the web service each time a print job is transferred to the On-the-Go Print Queue 40, or after it is actually transferred to or printed at a printer. Information identifying the user who had submitted the print job would be included with the print job when it is submitted to the On-the-Go Print Queue service. Thus, when the printer accessed by the user with his/her smart card 200 or other portable computing device prints the job, then the printer could determine the reward to be paid to the web service. This step could be performed in conjunction with the billing/debiting of the user account referenced in block 730.

Referring to block 795, the reward determined in block 790 could then be associated with or otherwise provided to an account for the web service, or the originator of the print data, or another appropriate party.

It should be noted that in a variation of the present invention, a reference to the user's On-the-Go Print Queue service and optionally the user's public key could be stored on a web service located on the public Internet. Other web services could then obtain this information from a directory using the user's identification which may include appropriate verification information. Such a separate service would make it easier for the user to provide this information to configure a web service such as Yahoo.

The embodiment of FIG. 7 enables a user to select data to be printed from web services. This embodiment provides an easy method of initiating printing through a smart card 200 or other portable computing device. Using this embodiment of the invention, the user can print when using the public web browsing devices often found in public locations like airports and coffee shops. It is frequently not possible to print directly from public web browsing devices. Some of these public web browsing devices are connected to printers, but others are not. Because printing does not begin until the smart card or other portable computing device is inserted into or otherwise communicates with a public printer, the printing can be completely private. This is in contrast to other mobile printing techniques where a print job is directed to a printer using some identifier. An error in the identifier could result in inappropriately printing sensitive materials hundreds of miles away from the intended destination.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps that may be required.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principals of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for mobile printing, comprising:
   reading with a printer a reference to a print queue from a portable computing device, the reference read from the portable computing device including a location of the print queue on the Internet to which print data was transferred for storage;
   accessing the print queue with the printer;
   receiving with the printer the print data stored on the print queue; and
   printing the print data on the printer.

2. The method as defined in claim 1, wherein the print data comprises generic print data; and
   wherein the reference read from the portable computing device includes a location of the print queue on the Internet to which the generic print data was transferred for storage.

3. The method as defined in claim 1, wherein the print data comprises encrypted print data; and
   wherein the reference read from the portable computing device includes a location of the print queue on the Internet to which the encrypted print data was transferred for storage; and
   wherein the portable computing device includes a key for decryption recorded therein.

4. The method as defined in claim 3,
   wherein the print data is encrypted with a session key; and
   wherein the session key is encrypted using a public key.

5. The method as defined in claim 3, wherein the print data is encrypted using a public key from a public key-private key pair; and wherein the key for decryption is the private key.

6. The method as defined in claim 1, wherein the portable computing device is a smart card configured for insertion into the printer.

7. The method as defined in claim 1, further comprising, after accessing the print queue, displaying a list of jobs available for printing on a front panel display of the printer.

8. The method as defined in claim 1, further comprising, after accessing the print queue, displaying print parameter options on a front panel display of the printer.

9. The method as defined in claim 7, further comprising reordering print jobs in the print queue with the printer front panel display.

10. The method as defined in claim 7, further comprising deleting a print job from the print queue with the printer front panel display.

11. The method as defined in claim 1, further comprising providing proof of printer authenticity to the print queue prior to the printer receiving the print data.

12. A method for mobile printing, comprising:
    reading with a printer a reference to a print queue from a portable computing device, the reference read from the portable computing device including a location of the print queue on the Internet to which print data was transferred for storage;
    accessing the print queue with the printer;
    receiving with the printer the print data stored on the print queue;
    printing the print data on the printer; and
    accessing the print queue to set at least one storage or print parameter.

13. The method as defined in claim 12, wherein the parameter is the ordering or deletion of print jobs.

14. A method for mobile printing, comprising:
    reading with a printer a reference to a print queue from a portable computing device, the reference read from the portable computing device including a location of the print queue on the Internet to which print data was transferred for storage;
    accessing the print queue with the printer;
    receiving with the printer the print data stored on the print queue;
    printing the print data on the printer; and
    displaying a message to a user if print data was successfully submitted to the print queue.

15. A method for mobile printing, comprising:
    reading with a printer a reference to a print queue from a portable computing device, the reference read from the portable computing device including a location of the print queue on the Internet to which print data was transferred for storage;
    accessing the print queue with the printer;
    receiving with the printer the print data stored on the print queue;
    printing the print data on the printer; and
    displaying information on a cost of printing a print job on a front panel display of the printer.

16. The method as defined in claim 15, further comprising linking to an accounting system to bill/debit a user account for the cost of printing.

17. The method as defined in claim 16, wherein the accounting system computes a split of any proceeds from the billing/debiting among at least two other parties.

18. A method for mobile printing, comprising:
    reading with a printer a reference to a print queue from a portable computing device, the reference read from the portable computing device including a location of the print queue on the Internet to which print data was transferred for storage;
    accessing the print queue with the printer;
    receiving with the printer the print data stored on the print queue; and
    printing the print data on the printer,
    wherein the accessing the print queue comprises providing a security ID that is separate from the portable computing device to the print queue to obtain access thereto.

19. A method for mobile printing, comprising:
    reading with a printer a reference to a print queue from a portable computing device, the reference read from the portable computing device including a location of the print queue on the Internet to which print data was transferred for storage;
    accessing the print queue with the printer;

receiving with the printer the print data stored on the print queue;

printing the print data on the printer; and validating an identity of the printer prior to the printer receiving the print data.

20. A non-transitory computer-readable media having stored thereon a program product for mobile printing, the program product comprising machine-readable program code to:

read with a printer a reference to a print queue from a portable computing device, the reference read from the portable computing device including a Uniform Resource Locator (URL) for the print queue on the Internet to which print data was transferred for storage;

access the print queue with the printer; and receive with the printer the print data stored on the print queue to enable printing of the print data on the printer.

21. The non-transitory computer-readable media as defined in claim 20, wherein the print data comprises generic print data; and wherein the reference read from the portable computing device includes a Uniform Resource Locator (URL) for the print queue on the Internet to which the generic print data was transferred for storage.

22. The non-transitory computer-readable media as defined in claim 20, wherein the print data comprises encrypted print data; and wherein the reference read from the portable computing device includes a Uniform Resource Locator (URL) for the print queue on the Internet to which the encrypted print data was transferred for storage; and wherein the portable computing device includes a key for decryption recorded therein.

23. The non-transitory computer-readable media as defined in claim 22, wherein the print data is encrypted with a session key; and wherein the session key is encrypted using a public key.

24. The non-transitory computer-readable media as defined in claim 22, wherein the print data is encrypted using a public key from a public key-private key pair; and wherein the key for decryption is the private key.

25. The non-transitory computer-readable media as defined in claim 20, wherein the portable computing device is a smart card configured for insertion into the printer.

26. The non-transitory computer-readable media as defined in claim 20, further comprising code to display a list of jobs available for printing on a front panel display of the printer.

27. The non-transitory computer-readable media as defined in claim 20, further comprising code to display print parameter options on a front panel display of the printer.

28. The non-transitory computer-readable media as defined in claim 20, further comprising code to provide proof of printer authenticity to the print queue prior to the printer receiving the print data.

29. A non-transitory computer-readable media having stored thereon a program product for mobile printing, the program product comprising machine-readable program code to:

read with a printer a reference to a print queue from a portable computing device, the reference read from the portable computing device including a Uniform Resource Locator (URL) for the print queue on the Internet to which print data was transferred for storage;

access the print queue with the printer; and receive with the printer the print data stored on the print queue to enable printing of the print data on the printer; and access the print queue to set at least one storage or print parameter.

30. The non-transitory computer-readable media as defined in claim 29, wherein the parameter is the ordering or deletion of print jobs.

31. A non-transitory computer-readable media having stored thereon a program product for mobile printing, the program product comprising machine-readable program code to:

read with a printer a reference to a print queue from a portable computing device, the reference read from the portable computing device including a Uniform Resource Locator (URL) for the print queue on the Internet to which print data was transferred for storage;

access the print queue with the printer;

receive with the printer the print data stored on the print queue to enable printing of the print data on the printer; and display a message to a user if print data was successfully submitted to the print queue.

32. A non-transitory computer-readable media having stored thereon a program product for mobile printing, the program product comprising machine-readable program code to:

read with a printer a reference to a print queue from a portable computing device, the reference read from the portable computing device including a Uniform Resource Locator (URL) for the print queue on the Internet to which print data was transferred for storage;

access the print queue with the printer;

receive with the printer the print data stored on the print queue to enable printing of the print data on the printer; and validate an identity of the printer.

33. A printer for facilitating mobile computing, comprising:

a component for accessing the Internet;

structure for reading a smart card and obtaining from the smart card a reference to a print queue on the Internet, the reference obtained from the smart card comprising an Internet address of the print queue at which the print data is stored;

a component for accessing the print queue and downloading therefrom print data; and structure for printing the print data.

34. The printer as defined in claim 33, further comprising a decryption engine for decrypting the print data prior to printing.

35. The printer as defined in claim 34, further comprising a component for accessing the smart card to obtain a decryption key in order to facilitate the decryption of the print data.

36. The printer as defined in claim 34, further comprising a component for causing the smart card to decrypt a session key, and a decryption engine for decrypting the print data using the session key.

37. The printer as defined in claim 33, further comprising a front panel display screen for displaying queued print jobs for a user.

38. The printer as defined in claim 37, further comprising the printer front panel display screen enabling reordering print jobs in the print queue.

39. The printer as defined in claim 37, further comprising the printer front panel display screen enabling deleting a print job from the print queue.

40. The printer as defined in claim 33, further comprising a component for providing proof of printer authenticity to the print queue prior to the printer receiving the print data.

41. A printer for facilitating mobile computing, comprising:
   a component for accessing the Internet;
   structure for reading a smart card and obtaining from the smart card a reference to a print queue on the Internet, the reference obtained from the smart card comprising an Internet address of the print queue at which the print data is stored;
   a component for accessing the print queue and downloading therefrom print data
   structure for printing the print data; and
   a front panel display screen for accessing the print queue to set at least one storage or print parameter.

42. The printer as defined in claim 41, wherein the parameter is the ordering or deletion of print jobs.

43. A printer for facilitating mobile computing, comprising:
   a component for accessing the Internet;
   structure for reading a smart card and obtaining from the smart card a reference to a print queue on the Internet, the reference obtained from the smart card comprising an Internet address of the print queue at which the print data is stored;
   a component for accessing the print queue and downloading therefrom print data
   structure for printing the print data; and
   a front panel display screen for displaying information on a cost of printing a print job.

44. The printer as defined in claim 43, further comprising a component for linking to an accounting system to bill/debit a user account for the cost of printing.

45. The printer as defined in claim 44, wherein the accounting system computes a split of any proceeds from the billing/debiting among at least two other parties.

46. A printer for facilitating mobile computing, comprising:
   a component for accessing the Internet;
   structure for reading a smart card and obtaining from the smart card a reference to a print queue on the Internet, the reference obtained from the smart card comprising an Internet address of the print queue at which the print data is stored;
   a component for accessing the print queue and downloading therefrom print data
   structure for printing the print data; and
   a component for validating an identity of the printer prior to the printer receiving the print data.

\* \* \* \* \*

UNITED STATES PATENT AND TRADEMARK OFFICE
CERTIFICATE OF CORRECTION

PATENT NO. : 8,699,053 B2  
APPLICATION NO. : 10/053673  
DATED : April 15, 2014  
INVENTOR(S) : Rick P. Hoover et al.

Page 1 of 1

It is certified that error appears in the above-identified patent and that said Letters Patent is hereby corrected as shown below:

In the Claims

In column 19, line 67, in Claim 29, after "printer;" delete "and".

In column 21, line 13, in Claim 41, delete "data" and insert -- data; --, therefor.

In column 22, line 2, in Claim 43, delete "data" and insert -- data; --, therefor.

In column 22, line 22, in Claim 46, delete "data" and insert -- data; --, therefor.

Signed and Sealed this  
Twenty-ninth Day of September, 2015

Michelle K. Lee  
*Director of the United States Patent and Trademark Office*